US006977371B2

(12) United States Patent
Bateman et al.

(10) Patent No.: US 6,977,371 B2
(45) Date of Patent: Dec. 20, 2005

(54) MASS SPECTROMETER

(75) Inventors: Robert Harold Bateman, Knutsford (GB); Kevin Giles, Altrincham (GB)

(73) Assignee: Micromass UK Limited, Manchester (GB)

( * ) Notice: Subject to any disclaimer, the term of this patent is extended or adjusted under 35 U.S.C. 154(b) by 10 days.

(21) Appl. No.: 10/457,515

(22) Filed: Jun. 10, 2003

(65) Prior Publication Data

US 2004/0251411 A1 Dec. 16, 2004

(51) Int. Cl.[7] .......................... B01D 59/44; H01J 49/00
(52) U.S. Cl. ....................... 250/288; 250/281; 250/292
(58) Field of Search ................................ 250/288, 281, 250/292

(56) References Cited

U.S. PATENT DOCUMENTS

| | | | | |
|---|---|---|---|---|
| 4,405,860 A | | 9/1983 | Brunnee et al. | |
| 4,948,962 A | | 8/1990 | Mitsui et al. | |
| 5,572,035 A | | 11/1996 | Franzen | |
| 5,818,055 A | | 10/1998 | Franzen | |
| 5,962,851 A | | 10/1999 | Whitehouse et al. | |
| 6,011,259 A | * | 1/2000 | Whitehouse et al. | 250/287 |
| 6,107,628 A | | 8/2000 | Smith et al. | |
| 6,504,148 B1 | * | 1/2003 | Hager | 250/282 |
| 6,642,514 B2 | * | 11/2003 | Bateman et al. | 250/288 |
| 6,670,606 B2 | * | 12/2003 | Verentchikov et al. | 250/287 |
| 6,700,117 B2 | * | 3/2004 | Franzen | 250/287 |
| 2001/0035498 A1 | | 11/2001 | Li et al. | |
| 2002/0063207 A1 | | 5/2002 | Bateman et al. | |
| 2002/0063209 A1 | | 5/2002 | Bateman et al. | |
| 2002/0063210 A1 | | 5/2002 | Bateman et al. | |
| 2002/0148959 A1 | | 10/2002 | Weiss et al. | |

FOREIGN PATENT DOCUMENTS

| | | |
|---|---|---|
| CA | 2281405 | 3/2000 |
| GB | 2302985 | 2/1997 |
| GB | 2315364 | 1/1998 |
| GB | 2 370 685 | 7/2002 |
| JP | 11-307040 | 11/1999 |
| JP | 2000-113852 | 4/2000 |
| JP | 2000-123780 | 4/2000 |
| WO | WO 97/49111 | 12/1997 |
| WO | WO 98/06481 | 2/1998 |
| WO | WO 99/38185 | 7/1999 |
| WO | WO 99/62101 | 12/1999 |
| WO | WO 02/43105 | 5/2002 |

OTHER PUBLICATIONS

Gerlich, "Inhomogeneous RF Fields: A Versatile Tool For the Study of Processes With Slow Ions", Advances in Chemical Physics Series, vol. 82, pp. 1–176, 1992.

Teloy et al., "Integral Cross Sections For Ion–Molecule Reactions. I. The Guided Beam Technique", Chemical Physics, vol. 4, pp. 417–427, 1974.

Shaffer et al., "A Novel Ion Funnel for Ion Focusing at Elevated Pressures", The 45th ASMS Conference on Mass Spectrometry and Allied Topics, Jun., 1997.

(Continued)

*Primary Examiner*—Nikita Wells
*Assistant Examiner*—Anthony Quash
(74) *Attorney, Agent, or Firm*—Diederiks & Whitelaw, PLC

(57) ABSTRACT

A mass spectrometer is disclosed having a gas collision cell. An AC or RF ion guide comprising a plurality of ring electrodes which preferably have the same internal diameter is provided within the gas collision cell. The ion guide extends upstream and/or downstream of the gas collision cell so that ions may be continuously radially confined as they pass from a vacuum chamber maintained at a relatively low pressure, through an inlet differential pumping aperture to the gas collision cell, through the gas collision cell and then out of the gas collision cell through an outlet differential pumping aperture.

50 Claims, 5 Drawing Sheets

OTHER PUBLICATIONS

Gerlich et al., "Ion Trap Studies of Association Processes in Collisions of $CH_3^+$ and $CD_3^+$ with n–$H_2$, p–$H_2$, $D_2$ and He at 80K", The Astrophysical Journal, vol. 347, pp. 849–854, 1989.

Shaffer et al., "An Ion Funnel Interface for Improved Ion Focusing and Sensitivity Using Electrospray Ionization Mass Spectrometry", Analytical Chemistry, vol. 70, No. 19, pp. 4111–4119, 1998.

Shaffer et al., "Characterization of an Improved Electrodynamic Ion Funnel Interface for Electrospray Ionization Mass Spectrometry", Analytical Chemistry, vol. 71, No. 15, pp. 2957–2964, 1999.

Kim et al., "Design and Implementation of a New Electrodynamic Ion Funnel", Analytical Chemistry, vol. 72, No. 10, pp. 2247–2255, 2000.

Tolmachev et al., "Charge Capacity Limitations of Radio Frequency Ion Guides in Their Use for Improved Ion Accumulation and Trapping in Mass Spectrometry", Analytical Chemistry, vol. 72, No. 5 pp. 970–978, 2000.

Shaffer et al., "A Novel Ion Funnel for Focusing Ions at Elevated Pressure Using Electrospray Ionization Mass Spectrometry", Rapid Communications in Mass Spectrometry, vol. 11, pp. 1813–1817, 1997.

* cited by examiner

MASS SPECTROMETER

BACKGROUND OF THE INVENTION

I. Field of the Invention

The present invention relates to a mass spectrometer and a method of mass spectrometry.

II. Discussion of the Prior Art

Ion guides comprising RF only multipole rod sets such as quadrupoles, hexapoles and octopoles are well known.

Whitehouse and co-workers have disclosed in WO98/06481 and WO99/62101 an arrangement wherein a multipole rod set ion guide extends between two vacuum chambers. However, as will be appreciated by those skilled in the art, since each rod in a multipole rod set has a typical diameter of around 5 mm, and a space must be provided between opposed rods in order for there to be an ion guiding region, then the interchamber aperture when using such an arrangement is correspondingly very large (i.e. >15 mm in diameter) with a corresponding cross sectional area >150 $mm^2$. Such large interchamber apertures drastically reduce the effectiveness of the vacuum pumps which are most effective when the interchamber orifice is as small as possible (i.e. only a few millimeters in diameter).

Gas collision cells are known which are used in tandem mass spectrometers to induce fragmentation. Such collision cells comprise an enclosed chamber arranged to be maintained at an intermediate pressure e.g. $10^{-3}$–$10^{-1}$ mbar. The gas collision cell is positioned within a vacuum chamber maintained at a relatively lower pressure e.g. $10^{-6}$–$10^{-4}$ mbar. The gas collision cell has a relatively small inlet differential pumping aperture through which ions enter and a relatively small outlet differential pumping aperture through which ions exit. Gas is introduced into the gas collision cell typically via a gas port. Gas which has been introduced into the collision cell will then leak out through the relatively small inlet and outlet differential pumping apertures into the vacuum chamber in which the gas collision cell is housed.

An RF ion guide upstream of the gas collision cell may be provided to transport ions towards the entrance orifice of the gas collision cell. Once ions have exited the ion guide and entered the gas collision cell they may then be transported through the gas collision cell by an RF ion guide disposed within the gas collision cell. Similarly, once the ions have exited the ion guide within the gas collision cell and have passed through the outlet differential pumping aperture they may then be transported away from the gas collision cell by means of a downstream RF ion guide. However, as ions pass from the upstream ion guide to the gas collision cell, the ions exit the upstream ion guide and are no longer radially confined as they enter the gas collision cell. Some ions will therefore be lost before the ions are received and are again radially confined by the RF ion guide disposed within the gas collision cell. Similarly, once ions leave the ion guide disposed within the gas collision cell they are no longer radially confined as they exit the gas collision cell. Some ions will therefore likewise be lost before the ions are once again radially confined within an RF ion guide disposed downstream of the gas collision cell.

It is therefore desired to provided an improved gas collision cell.

SUMMARY OF THE INVENTION

According to an aspect of the present invention there is provided a mass spectrometer, comprising:

a gas collision cell comprising a housing having an inlet differential pumping aperture and an outlet differential pumping aperture; and an AC or RF ion guide extending within the gas collision cell, the AC or RF ion guide comprising a plurality of electrodes having apertures;

wherein the AC or RF ion guide extends upstream of the inlet differential pumping aperture and an electrode of the AC or RF ion guide forms the inlet differential pumping aperture.

According to another aspect of the present invention there is provided a mass spectrometer, comprising:

a gas collision cell comprising a housing having an inlet differential pumping aperture and an outlet differential pumping aperture; and an AC or RF ion guide extending within the gas collision cell, the AC or RF ion guide comprising a plurality of electrodes having apertures;

wherein the AC or RF ion guide extends downstream of the outlet differential pumping aperture and an electrode of the AC or RF ion guide forms the outlet differential pumping aperture.

According to another aspect of the present invention there is provided a mass spectrometer, comprising:

a gas collision cell comprising a housing having an inlet differential pumping aperture and an outlet differential pumping aperture; and an AC or RF ion guide extending within the gas collision cell, the AC or RF ion guide comprising a plurality of electrodes having apertures;

wherein the AC or RF ion guide extends upstream of the inlet differential pumping aperture and downstream of the outlet differential pumping aperture and an electrode of the AC or RF ion guide forms the inlet differential pumping aperture and an electrode of the AC or RF ion guide forms the outlet differential pumping aperture.

Conventional ion guide arrangements typically comprise two discrete multipole ion guides with a discrete differential pumping aperture therebetween. Such an arrangement suffers from a disruption to the RF field near the end of a multipole rod set and other end effects. However, according to the preferred embodiment the ions do not leave the ion guide as they pass from one pressure region to another. Accordingly, end effect problems inherent with the conventional arrangements are effectively eliminated thereby resulting in improved ion transmission. The gas collision cell according to the preferred embodiment therefore represents a significant improvement compared to conventional collision cells.

Preferably, one or more of the electrodes may form further differential pumping apertures within the gas collision cell. The one or more electrodes may be considered to form in conjunction with the inlet differential pumping aperture a composite inlet differential pumping aperture comprised of a plurality of electrodes having apertures therein. Additionally/alternatively, the one or more electrodes may be considered to form in conjunction with the outlet differential pumping aperture a composite outlet differential pumping aperture comprised of a plurality of electrodes having apertures therein.

Preferably, 2, 3, 4, 5, 6, 7, 8, 9, 10, 11, 12, 13, 14, 15, 16, 17, 18, 19, 20, 20–30, 30–40, 40–50, 50–60, 60–70, 70–80, 80–90, 90–100, 100–110, 110–120, 120–130, 130–140, 140–150 or more than 150 differential pumping apertures are provided within the gas collision cell or form a composite inlet and/or outlet differential pumping aperture.

Since the electrode forming the inlet differential pumping aperture and/or the outlet differential pumping aperture also form part of the AC or RF ion guide then an AC or RF voltage is preferably supplied to the inlet differential pumping aperture and/or the outlet differential pumping aperture.

The gas collision cell preferably forms a substantially gas-tight enclosure apart from the inlet differential pumping aperture and the outlet differential pumping aperture. The gas collision cell may further comprise a port through which a collision gas is introduced in use into the collision cell. A collision gas such as helium, argon, nitrogen, air or methane may be introduced into the collision gas cell. Other inert and non-inert gases may also be provided.

The ions preferably enter the collision cell via the inlet differential pumping aperture and exit the collision cell via the outlet differential pumping aperture.

At least 10%, 20%, 30%, 40%, 50%, 60%, 70%, 80%, 90%, 95% or 100% of the electrodes preferably have substantially similar sized apertures. At least 10%, 20%, 30%, 40%, 50%, 60%, 70%, 80%, 90%, 95% or 100% of the electrodes may have apertures which become progressively smaller or larger.

According to an embodiment an electrode forming the inlet differential pumping aperture and/or an electrode forming the outlet differential pumping aperture and/or one or more electrodes forming further differential pumping apertures within the gas collision cell have an aperture having a diameter selected from the group consisting of: (i) 0.5–1.5 mm; (ii) 1.5–2.5 mm; (iii) 2.5–3.5 mm; (iv) 3.5–4.5 mm; (v) 4.5–5.5 mm; (vi) 5.56.5–6.5 mm; (vii) 6.5–7.5 mm; (viii) 7.5–8.5 mm; (ix) 8.5–9.5 mm; (x) 9.5–10.5 mm; (xi) less than or equal to 10.0 mm; (xii) less than or equal to 9.0 mm; (xiii) less than or equal to 8.0 mm; (xiv) less than or equal to 7.0 mm; (xv) less than or equal to 6.0 mm; (xvi) less than or equal to 5.0 mm; (xvii) less than or equal to 4.0 mm; (xviii) less than or equal to 3.0 mm; (xix) less than or equal to 2.0 mm; (xx) less than or equal to 1.0 mm; (xxi) 0–2 mm; (xxii) 2–4 mm; (xxiii) 4–6 mm; (xxiv) 6–8 mm; and (xxv) 8–10 mm.

According to an embodiment at least 10%, 20%, 30%, 40%, 50%, 60%, 70%, 80%, 90%, 95% or 100% of the electrodes forming the AC or RF ion guide apart from an electrode forming the inlet differential pumping aperture and/or an electrode forming the outlet differential pumping aperture and/or one or more electrodes forming further differential pumping apertures within the gas collision cell have an aperture having a diameter selected from the group consisting of: (i) 0.5–1.5 mm; (ii) 1.5–2.5 mm; (iii) 2.5–3.5 mm; (iv) 3.5–4.5 mm; (v) 4.5–5.5 mm; (vi) 5.5–6.5 mm; (vii) 6.5–7.5 mm; (viii) 7.5–8.5 mm; (ix) 8.5–9.5 mm; (x) 9.5–10.5 mm; (xi) less than or equal to 10.0 mm; (xii) less than or equal to 9.0 mm; (xiii) less than or equal to 8.0 mm; (xiv) less than or equal to 7.0 mm; (xv) less than or equal to 6.0 mm; (xvi) less than or equal to 5.0 mm; (xvii) less than or equal to 4.0 mm; (xviii) less than or equal to 3.0 mm; (xix) less than or equal to 2.0 mm; (xx) less than or equal to 1.0 mm; (xxi) 0–2 mm; (xxii) 2–4 mm; (xxiii) 4–6 mm; (xxiv) 6–8 mm; and (xxv) 8–10 mm.

Embodiments are contemplated wherein an electrode forming the inlet differential pumping aperture and/or an electrode forming the outlet differential pumping aperture and/or one or more electrodes forming further differential pumping apertures within the gas collision cell have an aperture which is either: (i) substantially smaller than the other electrodes forming the AC or RF ion guide; (ii) substantially the same size as the other electrodes forming the AC or RF ion guide; or (iii) substantially larger than the other electrodes forming the AC or RF ion guide.

The inlet differential pumping aperture and/or the outlet differential pumping aperture and/or one or more electrodes forming further differential pumping apertures within the gas collision cell may have an area selected from the group consisting of: (i) less than or equal to 40 $mm^2$; (ii) less than or equal to 35 $mm^2$; (iii) less than or equal to 30 $mm^2$; (iv) less than or equal to 25 $mm^2$; (V) less than or equal to 20 $mm^2$; (vi) less than or equal to 15 $mm^2$; (vii) less than or equal to 10 $mm^2$; and (viii) less than or equal to 5 $mm^2$. The area of the differential pumping aperture is therefore preferably more than an order of magnitude smaller than the area of the differential pumping aperture which is effectively provided when a multipole ion guide extends between two vacuum regions.

The AC or RF ion guide may comprise at least 4, 5, 6, 7, 8, 9, 10, 20, 30, 40, 50, 60, 70, 80, 90, 100, 110, 120, 130, 140, 150, 160, 170, 180, 190 or 200 electrodes.

The gas collision cell is preferably provided in a vacuum chamber maintained at a pressure selected from the group consisting of: (i) $<10^{-4}$ mbar; (ii) $<10^{-5}$ mbar; (iii) $<10^{-6}$ mbar; and (iv) $10^{-4}$–$10^{-6}$ mbar.

The pressure within the gas collision cell is preferably selected from the group consisting of: (i) $>10^{-4}$ mbar; (ii) $>10^{-3}$ mbar; (iii) $>10^{-2}$ mbar; (iv) $>10^{-1}$ mbar; and (v) $10^{-3}$–$10^{-1}$ mbar.

The gas collision cell is preferably maintained at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar.

The gas collision cell is preferably maintained at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

The gas collision cell is preferably maintained, in use, at a pressure selected from the group consisting of: (i) between 0.0001 and 10 mbar; (ii) between 0.0001 and 1 mbar; (iii) between 0.0001 and 0.1 mbar; (iv) between 0.0001 and 0.01 mbar; (v) between 0.0001 and 0.001 mbar; (vi) between 0.001 and 10 mbar; (vii) between 0.001 and 1 mbar; (viii) between 0.001 and 0.1 mbar; (ix) between 0.001 and 0.01 mbar; (x) between 0.01 and 10 mbar; (xi) between 0.01 and 1 mbar; (xii) between 0.01 and 0.1 mbar; (xiii) between 0.1 and 10 mbar; (xiv) between 0.1 and 1 mbar; and (xv) between 1 and 10 mbar.

At least 10%, 20%, 30%, 40%, 50%, 60%, 70%, 80%, 90%, 95% or 100% of the electrodes may be connected to both a DC and an AC or RF voltage supply. Axially adjacent electrodes may be supplied with AC or RF voltages having a phase difference of 180°.

The length of the AC or RF ion guide is preferably selected from the group consisting of: (i) 1–5 cm; (ii) 5–10 cm; (iii) 10–15 cm; (iv) 15–20 cm; (v) 20–25 cm; (vi) 25–30 cm; (vii) 30–35 cm; (viii) 35–40 cm; (ix) 40–45 cm; (x) 45–50 cm; and (xi) >50 cm.

According to a particularly preferred embodiment an atmospheric pressure ion source may be provided. Embodiments are contemplated wherein the ion source may be selected from the group consisting of: (i) Electrospray ("ESI") ion source; (ii) Atmospheric Pressure Chemical Ionisation ("APCI") ion source; (iii) Atmospheric Pressure Photo Ionisation ("APPI") ion source; (iv) Matrix Assisted Laser Desorption Ionisation ("MALDI") ion source; (v) Laser Desorption Ionisation ("LDI") ion source; (vi) Inductively Coupled Plasma ("ICP") ion source; (vii) Electron Impact ("EI") ion source; (viii) Chemical Ionisation ("CI") ion source; (ix) a Fast Atom Bombardment ("FAB") ion source; and (x) a Liquid Secondary Ions Mass Spectrometry ("LSIMS") ion source. The ion source may be either a continuous ion source or a pulsed ion source.

A mass analyser may be provided selected from the group consisting of: (i) a Time of Flight mass analyser; (ii) an orthogonal acceleration Time of Flight mass analyser; (iii) a quadrupole mass analyser; (iv) a 2D (linear) or 3D (Paul) quadrupole ion trap; and (v) a Fourier Transform Ion Cyclotron Resonance ("FTICR") mass analyser.

Preferably, at least 10%, 20%, 30%, 40%, 50%, 60%, 70%, 80%, 90%, 95% or 100% of the plurality of electrodes are arranged to be maintained at substantially the same DC reference potential about which an AC or RF voltage supplied to the electrodes is superimposed.

A means for supplying an AC or RF voltage to the electrodes is preferably provided. Preferably, an AC or RF generator is provided which is connected to the electrodes in such a way that at any instant during an AC or RF cycle of the output of the AC or RF generator, adjacent ones of the electrodes forming the AC or RF ion guide are supplied respectively with approximately equal positive and negative potentials relative to a reference potential.

In one embodiment the AC power supply may be an RF power supply. However, the present invention is not intended to be limited to RF frequencies. Furthermore, "AC" is intended to mean simply that the waveform alternates and hence embodiments of the present invention are also contemplated wherein non-sinusoidal waveforms including square waves are supplied to the ion guide.

According to an embodiment at least 5, 10, 15, 20, 25, 30, 35, 40, 45 or 50 of the electrodes are disposed upstream of the inlet differential pumping aperture and/or downstream of the outlet differential pumping aperture. At least 5, 10, 15, 20, 25, 30, 35, 40, 45 or 50 of the electrodes may be disposed within the gas collision cell.

One or more transient DC voltages or one or more transient DC voltage waveforms may be progressively applied to at least some of the electrodes so that ions are urged along at least a portion of the gas collision cell. An axial voltage gradient along at least a portion of the length of the gas collision cell may vary with time whilst ions are being transmitted through the gas collision cell. Additionally/alternatively, a constant axial DC voltage gradient may be maintained along at least a portion of the length of the ion guide.

Additionally/alternatively, one or more AC or RF voltages or voltage waveforms may be applied to at least some of the electrodes so that ions are urged along at least a portion of the gas collision cell. For example, an n-phase AC or RF voltage supply may be used wherein adjacent electrodes are supplied with AC or RF voltages having a phase difference of 360°/n where n=3, 4, 5, 6, 7, 8, 9, 10, 11, 12, 13, 14, 15, 16, 17, 18, 19, 20 or >20. This AC or RF voltage may be in addition to the an AC or RF voltage applied to the electrodes and which acts to radially confine the ions within the ion guide but which does not act to urge ions along the gas collision cell. The additional AC or RF voltage may be transient.

According to an embodiment the gas collision cell may comprise 3, 4, 5, 6, 7, 8, 9, 10, 11, 12, 13, 14, 15, 16, 17, 18, 19, 20, 21, 22, 23, 24, 25, 26, 27, 28, 29, 30 or >30 segments, wherein each segment comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or >30 electrodes and wherein the electrodes in a segment are maintained at substantially the same DC potential. A plurality of segments may be maintained at substantially the same DC potential. Each segment may be maintained at substantially the same DC potential as the subsequent nth segment wherein n is 3, 4, 5, 6, 7, 8, 9, 10, 11, 12, 13, 14, 15, 16, 17, 18, 19, 20, 21, 22, 23, 24, 25, 26, 27, 28, 29, 30 or >30.

Ions are preferably radially confined within the AC or RF ion guide by an AC or RF electric field. Ions may be radially confined within the AC or RF ion guide in a pseudo-potential well and may be constrained axially by a real potential barrier or well.

The transit time of ions through the gas collision cell may be selected from the group consisting of: (i) less than or equal to 20 ms; (ii) less than or equal to 10 ms; (iii) less than or equal to 5 ms; (iv) less than or equal to 1 ms; and (v) less than or equal to 0.5 ms.

At least 10%, 20%, 30%, 40%, 50%, 60%, 70%, 80%, 90%, 95% or 100% of the ions entering the gas collision cell may be arranged to have, in use, an energy greater than or equal to 10 eV for a singly charged ion or greater than or equal to 20 eV for a doubly charged ion such that the ions are caused to fragment within the gas collision cell.

Preferably, at least 10%, 20%, 30%, 40%, 50%, 60%, 70%, 80%, 90%, 95% or 100% of the ions entering the gas collision cell are arranged to fragment upon colliding with collision gas within the gas collision cell.

The gas collision cell and the AC or RF ion guide are preferably arranged in a vacuum chamber, the vacuum chamber comprising a vacuum pump for pumping gas from the vacuum chamber so as to produce a partial vacuum in the vacuum chamber.

According to an embodiment the amplitude of an AC or RF voltage supplied to the electrodes upstream of the inlet differential pumping aperture and/or supplied to the electrodes downstream of the outlet differential pumping aperture is different to the amplitude of an AC or RF voltage supplied to the electrodes of the AC or RF ion guide within the gas collision cell.

The preferred ion guide comprised of electrodes having apertures may take one of two main different forms. In a first form all the internal apertures of the electrodes may be substantially the same size. Such an arrangement is known as an "ion tunnel" ion guide. A second form referred to as an "ion funnel" is contemplated wherein the electrodes have internal apertures which become progressively smaller in size. Both forms are intended to fall within the scope of the present invention. The apertured electrodes in either case may comprise ring or annular electrodes. The inner circumference of the electrodes is preferably substantially circular. However, the outer circumference of the electrodes does not need to be circular and embodiments of the present invention are contemplated wherein the outer profile of the electrodes takes on other shapes.

According to an embodiment the AC or RF ion guide may comprise two interleaved comb-like arrangements of electrodes wherein all the electrodes forming a comb arrangement (which comprises a bar having a number of electrodes depending therefrom) are maintained at substantially the same DC potential and are electrically connected to the same phase of an AC or RF voltage supply.

It has been found that an ion tunnel ion guide exhibits an approximately 25–75% improvement in ion transmission efficiency compared with a conventional multipole, e.g. hexapole, ion guide of comparable length. The reasons for this enhanced ion transmission efficiency are not fully understood, but it is thought that an ion tunnel ion guide may have a greater acceptance angle and a greater acceptance area than a comparable multipole rod set ion guide. Accordingly, one advantage of the preferred embodiment is an improvement in ion transmission efficiency.

Although an ion tunnel ion guide is preferred, according to a less preferred embodiment, the ion guide may comprise an ion funnel. In order to act as an ion guide, a DC potential gradient may be applied along the length of the ion funnel in order to urge ions through the progressively smaller internal apertures of the electrodes. The ion funnel is believed, however, to suffer from a narrow mass to charge ratio bandpass transmission efficiency. Such problems are not found when using an ion tunnel ion guide.

Various types of other ion optical devices are also known including multipole rod sets, Einzel lenses, segmented multipoles, short (solid) quadrupole pre/post filter lenses ("stubbies"), 3D quadrupole ion traps comprising a central doughnut shaped electrode together with two concave end cap electrodes, and linear (2D) quadrupole ion traps comprising a multipole rod set with entrance and exit ring electrodes. However, such devices are not intended to be construed as the AC or RF ion guide according to the present invention.

According to a particularly preferred feature of the present invention, one of the electrodes forming the ion guide forms or constitutes a differential pumping aperture between two pressure regions. Such an arrangement is particularly advantageous since it allows the orifice to be much smaller than that which would be otherwise provided if a multipole rod set ion guide were used. A smaller orifice allows the vacuum pump pumping the vacuum chamber to operate more efficiently.

According to an aspect of the present invention there is provided a method of mass spectrometry, comprising:

providing a gas collision cell having a housing with an inlet differential pumping aperture and an outlet differential pumping aperture and an AC or RF ion guide extending within the gas collision cell, the AC or RF ion guide comprising a plurality of electrodes having apertures and wherein the AC or RF ion guide extends upstream of the inlet differential pumping aperture and an electrode of the AC or RF ion guide forms the inlet differential pumping aperture; and passing ions through the portion of the AC or RF ion guide arranged upstream of the inlet differential pumping aperture, through the inlet differential pumping aperture and into the AC or RF ion guide arranged within the gas collision cell.

Ions may remain radially confined within the AC or RF ion guide as they pass through the portion of the AC or RF ion guide arranged upstream of the inlet differential pumping aperture, through the inlet differential pumping aperture and into the AC or RF ion guide arranged within the gas collision cell.

According to another aspect of the present invention, there is provided a method of mass spectrometry, comprising:

providing a gas collision cell having a housing with an inlet differential pumping aperture and an outlet differential pumping aperture and an AC or RF ion guide extending within the gas collision cell, the AC or RF ion guide comprising a plurality of electrodes having apertures and wherein the AC or RF ion guide extends downstream of the outlet differential pumping aperture and an electrode of the AC or RF ion guide forms the outlet differential pumping aperture; and passing ions through the AC or RF ion guide arranged within the gas collision cell, through the outlet differential pumping aperture and into the portion of the AC or RF ion guide arranged downstream of the outlet differential pumping aperture.

Ions may remain radially confined within the AC or RF ion guide as they pass through the AC or RF ion guide arranged within the gas collision cell, through the outlet differential pumping aperture and into the portion of the AC or RF ion guide arranged downstream of the outlet differential pumping aperture.

According to another aspect of the present invention there is provided a method of mass spectrometry, comprising:

providing a gas collision cell having a housing with an inlet differential pumping aperture and an outlet differential pumping aperture and an AC or RF ion guide extending within the gas collision cell, the AC or RF ion guide comprising a plurality of electrodes having apertures and wherein the AC or RF ion guide extends upstream of the inlet differential pumping aperture and downstream of the outlet differential pumping aperture and an electrode of the AC or RF ion guide forms the inlet differential pumping aperture and an electrode of the AC or RF ion guide forms the outlet differential pumping aperture; and passing ions through the portion of the AC or RF ion guide arranged upstream of the inlet differential pumping aperture, through the inlet differential pumping aperture, through the AC or RF ion guide arranged within the gas collision cell, through the outlet differential pumping aperture and into the portion of the AC or RF ion guide arranged downstream of the outlet differential pumping aperture.

Ions may remain radially confined within the AC or RF ion guide as they pass through the portion of the AC or RF ion guide arranged upstream of the inlet differential pumping aperture, through the inlet differential pumping aperture, through the AC or RF ion guide arranged within the gas collision cell, through the outlet differential pumping aperture and into the portion of the AC or RF ion guide arranged downstream of the outlet differential pumping aperture.

BRIEF DESCRIPTION OF THE DRAWINGS

Various embodiments of the present invention together with other arrangements given for illustrative purposes only will now be described, by way of example only, and with reference to the accompanying drawings in which.

DETAILED DESCRIPTION OF THE PREFERRED EMBODIMENTS

Figure 1:
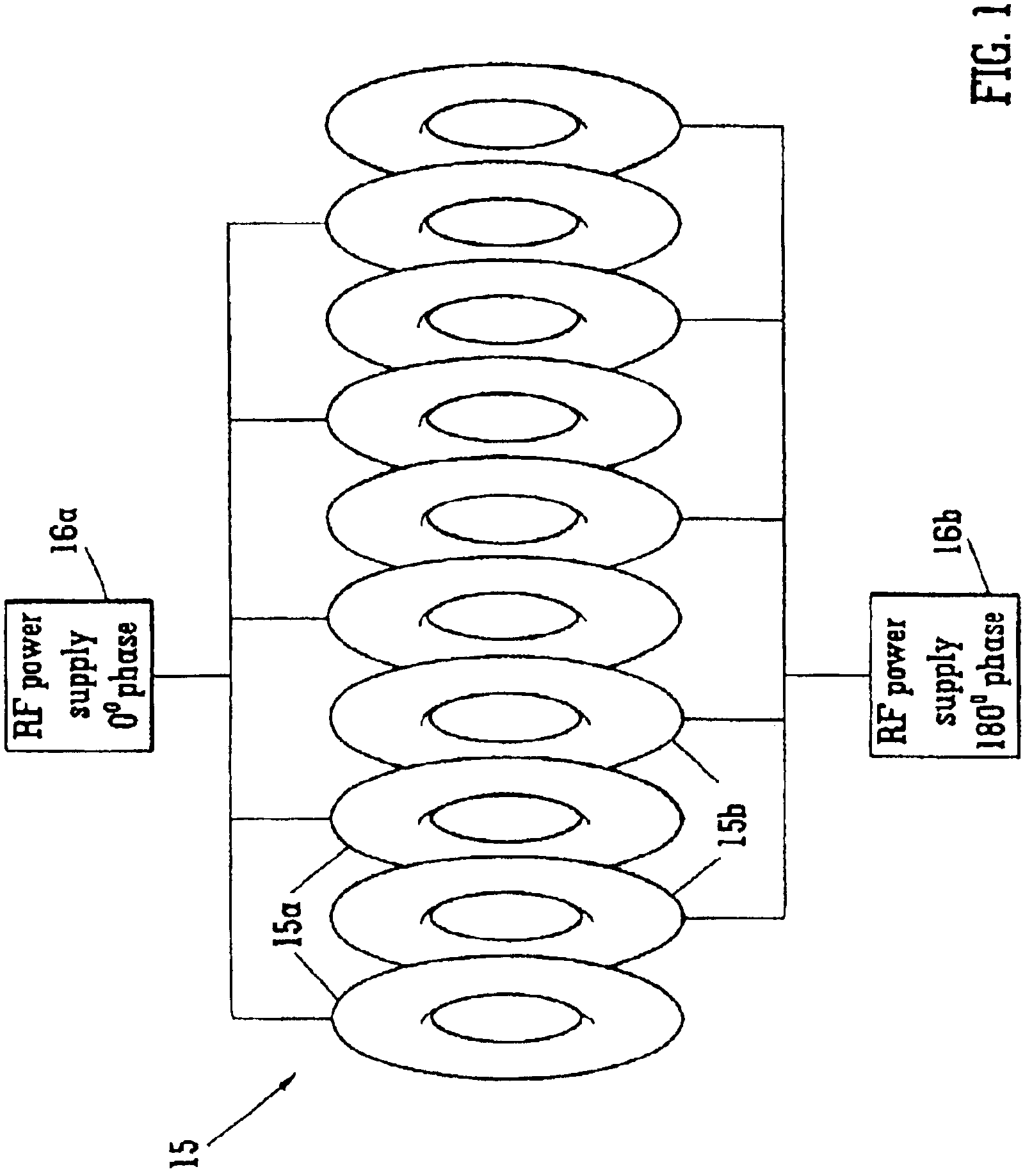
FIG. 1 shows an ion tunnel ion guide.

As shown in FIG. 1, an ion tunnel ion guide 15 comprises a plurality of electrodes 15*a*,15*b* having apertures. Adjacent electrodes 15*a*,15*b* are connected to different phases of an AC or RF power supply. For example, the first, third, fifth etc. electrodes 15*a* may be connected to the 0° phase supply 16*a*, and the second, fourth, sixth etc. electrodes 15*b* may be connected to the 180° phase supply 16*b*. Ions from an ion source pass through the ion tunnel 15 and are efficiently transmitted by it. In contrast to an ion funnel arrangement, preferably all of the electrodes 15*a*,15*b* are maintained at substantially the same DC reference potential about which an AC voltage is superimposed. Unlike ion traps, blocking DC potentials are preferably not applied to either the entrance or exit of the ion tunnel 15.

Figure 2:
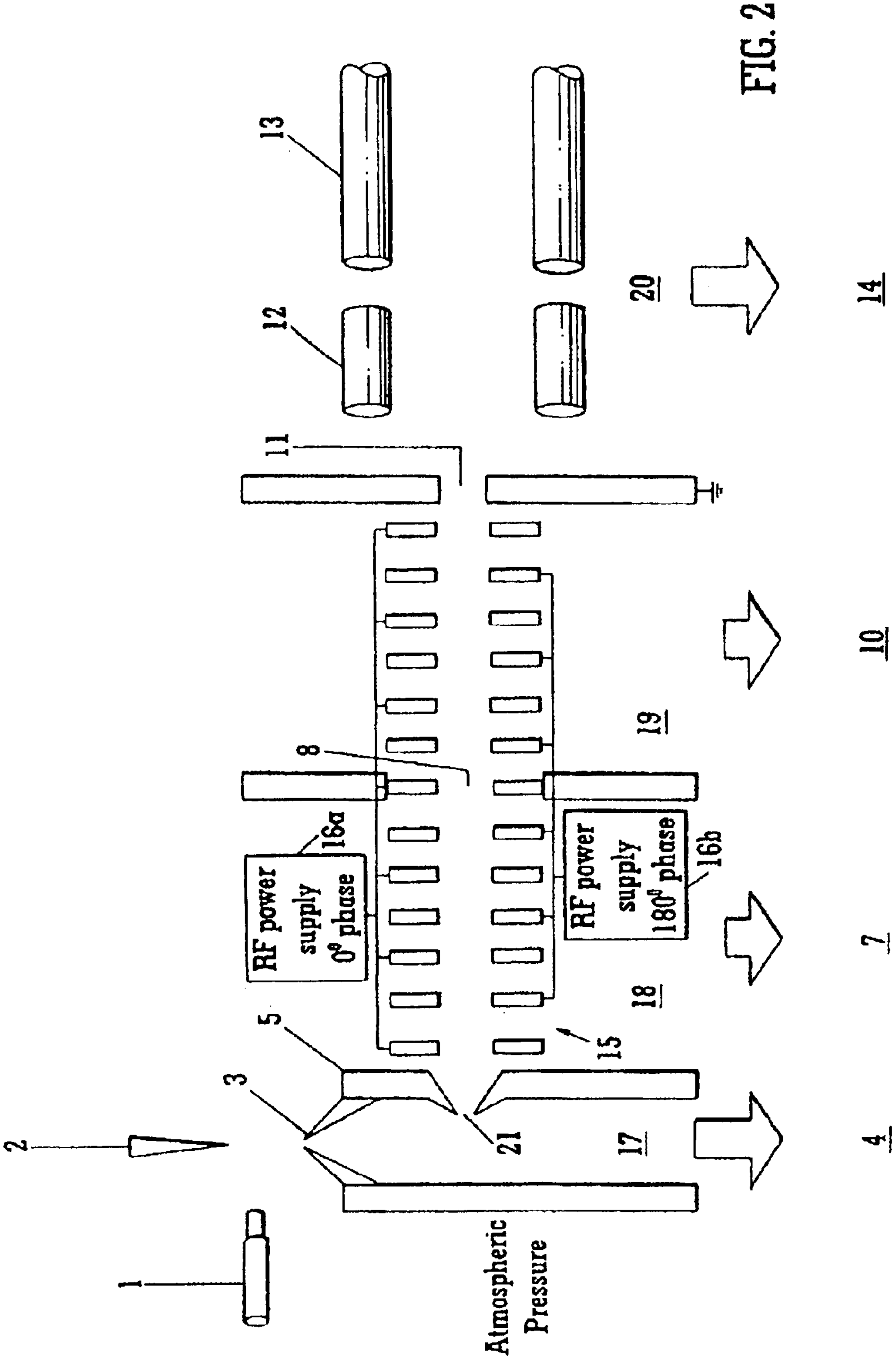
FIG. 2 shows another arrangement.

FIG. 2 shows an arrangement wherein an Electrospray ("ES") ion source 1 or an Atmospheric Pressure Chemical Ionisation ("APCI") ion source 1 (which requires a corona pin 2) emits ions which enter a vacuum chamber 17 via a sample cone 3. Vacuum chamber 17 is pumped by a rotary or mechanical pump 4. A portion of the gas and ions pass through a differential pumping aperture 21 with the plate surrounding the aperture being preferably maintained at 50–120V into a vacuum chamber 18 housing an ion tunnel ion guide 15 which extends into another vacuum chamber 19. Vacuum chamber 18 is pumped by a rotary or mechanical pump 7. Ions are transmitted by the ion guide 15 through the vacuum chamber 18 and pass, without exiting the ion guide 15, through another differential pumping aperture 8 formed by an electrode of the ion tunnel ion guide 15 into vacuum chamber 19 which is pumped by a turbo-molecular pump 10. Ions continue to be transmitted by the ion tunnel ion guide 15 through the vacuum chamber 19. The ions then leave the ion guide 15 and pass through differential pumping aperture 11 into an analyser vacuum chamber 20 which is pumped by a turbo-molecular pump 14. Analyser vacuum chamber 20 houses a prefilter rod set 12, a quadrupole mass filter 13 and may include other elements such as a collision cell (not shown), a quadrupole mass analyser together with an ion detector (not shown) or a Time of Flight mass analyser (not shown).

An AC voltage is applied to the electrodes and the ion tunnel 15 is preferably maintained at 0–2 V DC above the DC potential of the plate forming the differential pumping aperture 11 which is preferably at ground (0 V DC). The plate forming the differential pumping aperture 11 may be maintained at other DC potentials.

The ion tunnel 15 shown in FIG. 2 may be about 26 cm long and may comprise approximately 170 ring electrodes. Upstream vacuum chamber 18 may be maintained at a pressure greater than or equal to 1 mbar, and downstream vacuum chamber 19 may be maintained at a pressure between $10^{-3}$–$10^{-2}$ mbar. The ion guide 15 may be supplied with an AC or RF voltage at a frequency of between 1–2 MHz. However, frequencies of 800 kHz–3 MHz may also be used. The electrodes forming the ion tunnel _b 15may have circular apertures which may have a diameter in the range of 3–5 mm.

Electrodes of the ion tunnel 15 in one vacuum chamber may have a different peak AC or RF voltage amplitude compared with electrodes of the same ion tunnel 15 which are disposed in another vacuum chamber. For example, with reference to FIG. 2 the electrodes disposed in chamber 18 may be coupled to the AC or RF power supply 16*a*,16*b* via a capacitor but the electrodes disposed in chamber 19 may be directly coupled to the AC or RF power supply 16*a*,16*b*. Accordingly, the electrodes disposed in chamber 19 may see a peak AC or RF voltage of 500V, but the electrodes disposed in chamber 18 may see a peak AC voltage of 300V. The electrode which forms the differential pumping aperture 8 may be maintained at the AC voltage of either the electrodes in chamber 18 or the electrodes in chamber 19, or alternatively the electrode may be maintained at a voltage which is different from the other electrodes.

A ring stack ion tunnel ion guide such as the arrangement shown in FIGS. 1 and 2 preferably has an AC or RF voltage applied between neighbouring ring electrodes so as to guide ions along the central axis of the ion guide. The inhomogeneous AC or RF fields act to radially confine the ions to the central axis of the ion guide. The arrangement described above in relation to FIG. 2 relates to an arrangement wherein one ring within the ring stack also serves as the differential pumping orifice 8 between two vacuum chambers 18,19 maintained at different pressures. Such an arrangement may be usefully used in situations where it is desired to efficiently transport ions from a region of relatively high pressure e.g. vacuum chamber 18 to a region of relatively lower pressure e.g. vacuum chamber 19. Such a requirement occurs in a mass spectrometer with an atmospheric pressure ionisation source. Mass analysers need to operate at very low pressures, typically $<10^{-5}$ mbar, and so it is necessary to efficiently transport ions from the atmospheric pressure ionisation source to a low pressure region housing the mass analyser. An arrangement in which an AC or RF ion guide passes continually from one pressure region to the next provides a means of efficiently transporting ions through the differential pumping orifice between these two pressure regions. Ions that are radially confined by the inhomogeneous RF fields are less likely to be lost as they pass through the differential pumping orifice. The ring stack ion guide provides a particularly convenient and effective way of combining the RF ion guide function with a differential pumping orifice function.

Figure 3:
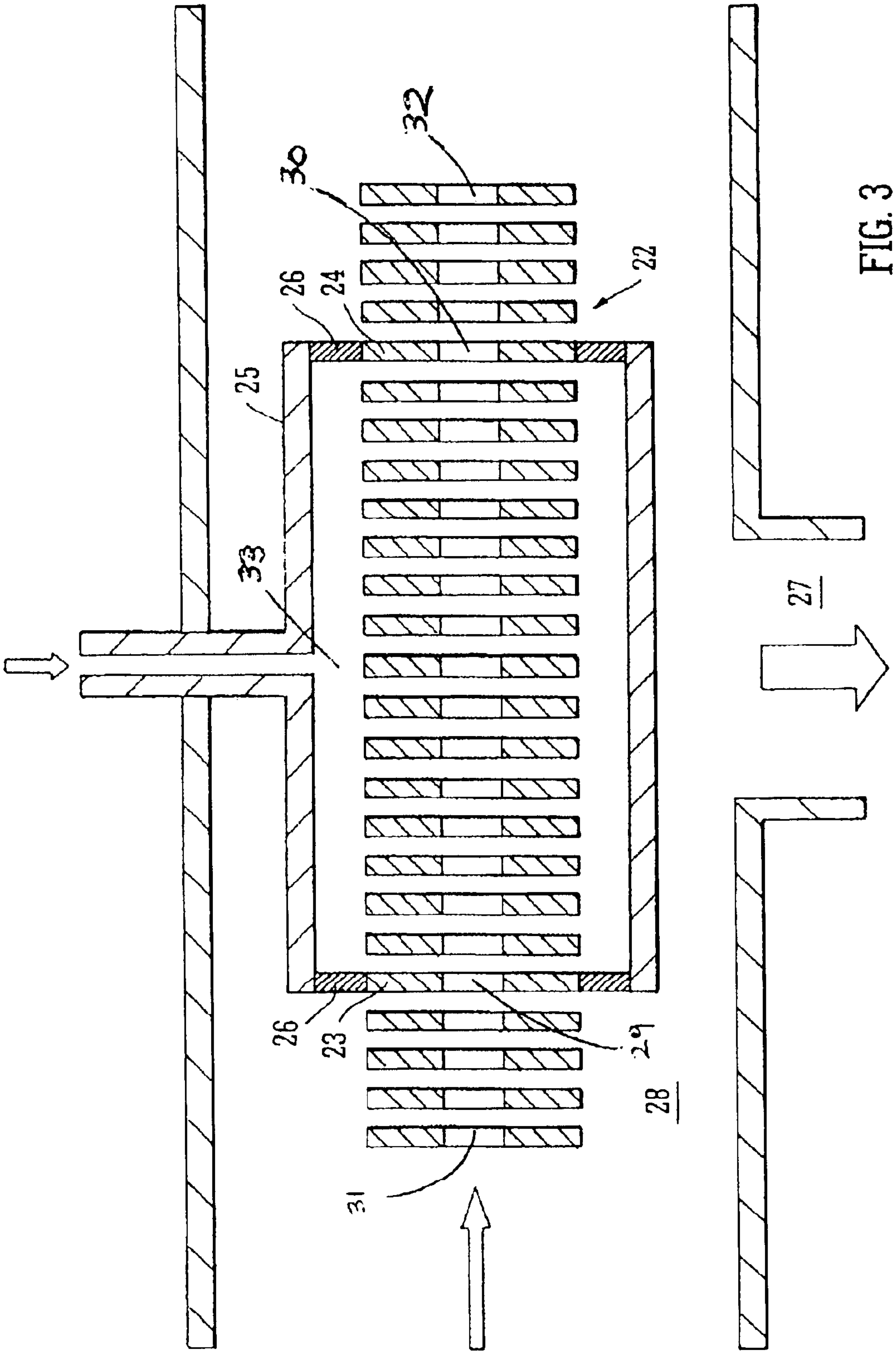
FIG. 3 shows a gas collision cell according to an embodiment.

FIG. 3 shows a gas collision cell 25 according to an embodiment of the present invention. An AC or RF ring stack 22, preferably an ion tunnel ion guide, is used to radially confine ions whilst two electrode rings 23,24 which form part of the ring stack 22 form inlet and outlet differential pumping orifices 29,30 between the gas collision cell 25 and the surrounding vacuum chamber 28. The vacuum chamber 28 is pumped by a vacuum pump (not shown) via a port 27. The electrode 23 forming the inlet differential pumping aperture 29 and the electrode 24 forming the outlet differential pumping aperture 30 may be mounted or otherwise provided within insulators 26. Ions are preferably radially confined within the AC or RF ion guide 22 as they are being transported to the inlet differential pumping aperture 29 and as they pass through the inlet differential pumping aperture 29 into the gas collision cell 25. The ions preferably continue to be radially confined as they pass through the gas collision cell 25, through the outlet differential pumping aperture 30 and move downstream from the gas collision cell 25. The ion guide 22 upstream of the inlet differential pumping aperture 29 preferably has an ion inlet orifice 31. Similarly, the ion guide 22 downstream of the outlet differential pumping aperture 30 preferably has an ion outlet orifice 32.

The continuous AC or RF field provided by the ion guide 22 enables ions to be efficiently transported from a region 28 maintained at a relatively low pressure (e.g. $10^{-6}$ to $10^{-4}$ mbar) into and through a region 33 maintained at an intermediate pressure (e.g. $10^{-3}$ mbar to $10^{-1}$ mbar) and back into and through a region 28 maintained at a relatively low pressure.

The movement of ions along the ion guide 22 through the regions of different pressure may be assisted or controlled by the superposition of axial DC potential fields. Ion movement may also be assisted or controlled by the superposition of a travelling DC potential wave in the form of one or more DC potential wells that move along a portion of the length of the ion guide 22. According to a less preferred embodiment an AC or RF voltage waveform may be applied to the ion guide 22 so as to urge ions along at least a portion of the length of the ion guide 22.

An embodiment is contemplated wherein an AC or RF ion guide extends into a gas collision cell with an electrode of the ion guide forming an inlet differential pumping aperture 29 but wherein the outlet differential pumping aperture is conventional. Another embodiment is contemplated wherein an AC or RF ion guide extends out from a gas collision cell with an electrode of the ion guide forming an outlet differential pumping aperture 30 but wherein the inlet differential pumping aperture is conventional.

Figure 4:
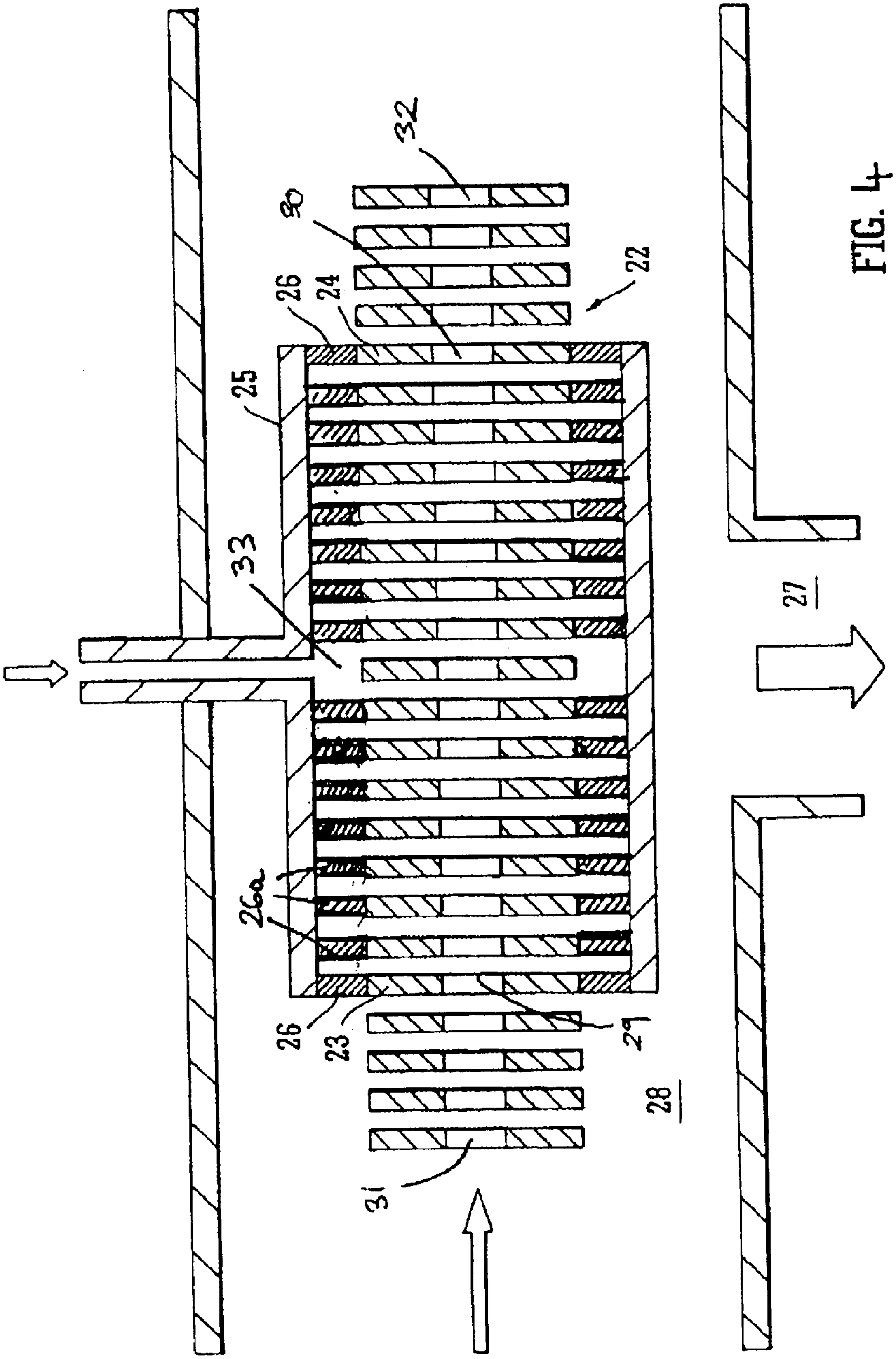
FIG. 4 shows a gas collision cell according to a preferred embodiment.

FIG. 4 shows a preferred embodiment wherein further insulating spacers 26*a* are provided for at least some of the electrodes disposed within the gas collision cell 25. The further insulating spacers 26*a* are preferably mounted to the housing of the gas collision cell 25 and create further multiple differential pressure regions by forming further differential pumping apertures along the length of the gas collision cell 25. As will be readily appreciated, this ensures that the region 33 of the ion guide 22 disposed immediately adjacent the gas inlet port of the gas collision cell 25 will be maintained at a relatively higher pressure than regions of the ion guide 22 disposed towards the inlet and outlet differential pumping apertures 29,30.

The gas collision cell shown in FIG. 3 may be considered to comprise two differential pumping apertures 29,30, whereas the (schematic) gas collision cell 25 shown in FIG. 4 illustrates how numerous differential pumping apertures may be provided. With the gas collision cell 25 shown in FIG. 3 it is believed that the pressure along the majority of the length of the gas collision cell 25 is substantially constant. In the region immediately adjacent the inlet and outlet differential pumping apertures 29,30 the pressure rapidly reduces so that the pressure within 1–2 electrode spacings of the inlet/outlet differential pumping aperture 29,30 is lower than the region 33 immediately adjacent the exit of the gas inlet port. With the embodiment shown in FIG. 4 the pressure in the region 33 immediately adjacent the exit of the gas inlet port is preferably relatively higher than the pressure in the corresponding region 33 in the embodiment shown in FIG. 3 assuming that the gas flow rate into the gas inlet port and the pumping speed of the vacuum pump pumping the chamber 28 are kept constant in both cases.

With the embodiment shown in FIG. 4 the pressure in the gas collision cell 25 begins to fall outside the relatively high pressure (central) region 33. The embodiment shown in FIG. 4 allows the central innermost region 33 of the gas collision cell 25 to be maintained at a relatively high pressure but is less leaky than the embodiment shown in FIG. 3 and hence does not require a larger vacuum pump to be used to maintain vacuum chamber 28 at a relatively low pressure.

Other embodiments are contemplated wherein the gas inlet port is not symmetrically disposed within the gas collision cell 25 as shown in FIG. 4 and/or wherein the relatively higher pressure gas region 33 is disposed closer to one end of the gas collision cell 25 than the other. According to a less preferred embodiment the higher pressure gas region 33 may be arranged substantially closer to either the inlet differential pumping aperture 29 or the outlet differential pumping aperture 30. Embodiments are also contemplated wherein more than one relatively high pressure regions 33 are provided along the length of the gas collision cell 25.

Although the electrodes mounted within the further insulating spacers 26*a* have been described above as forming further differential pumping apertures implying that the pressure along the length of the gas collision cell 25 is graduated from the relatively high pressure region 33 to the inlet/outlet differential pumping apertures 29,30 it is also possible to consider the electrodes in conjunction with the electrodes 23,24 forming the inlet and outlet differential pumping apertures 29,30 as forming a single composite inlet differential pumping aperture and a single composite outlet differential pumping aperture. The embodiment shown in FIG. 4 could therefore be viewed as comprising a gas collision cell 25 having a relatively thick composite inlet differential pumping aperture (formed by a plurality of electrodes in addition to electrode 23), a relatively short high pressure gas region 33 and a relatively thick composite outlet differential pumping aperture (formed by a plurality of electrodes in addition to electrode 24).

Figure 5:
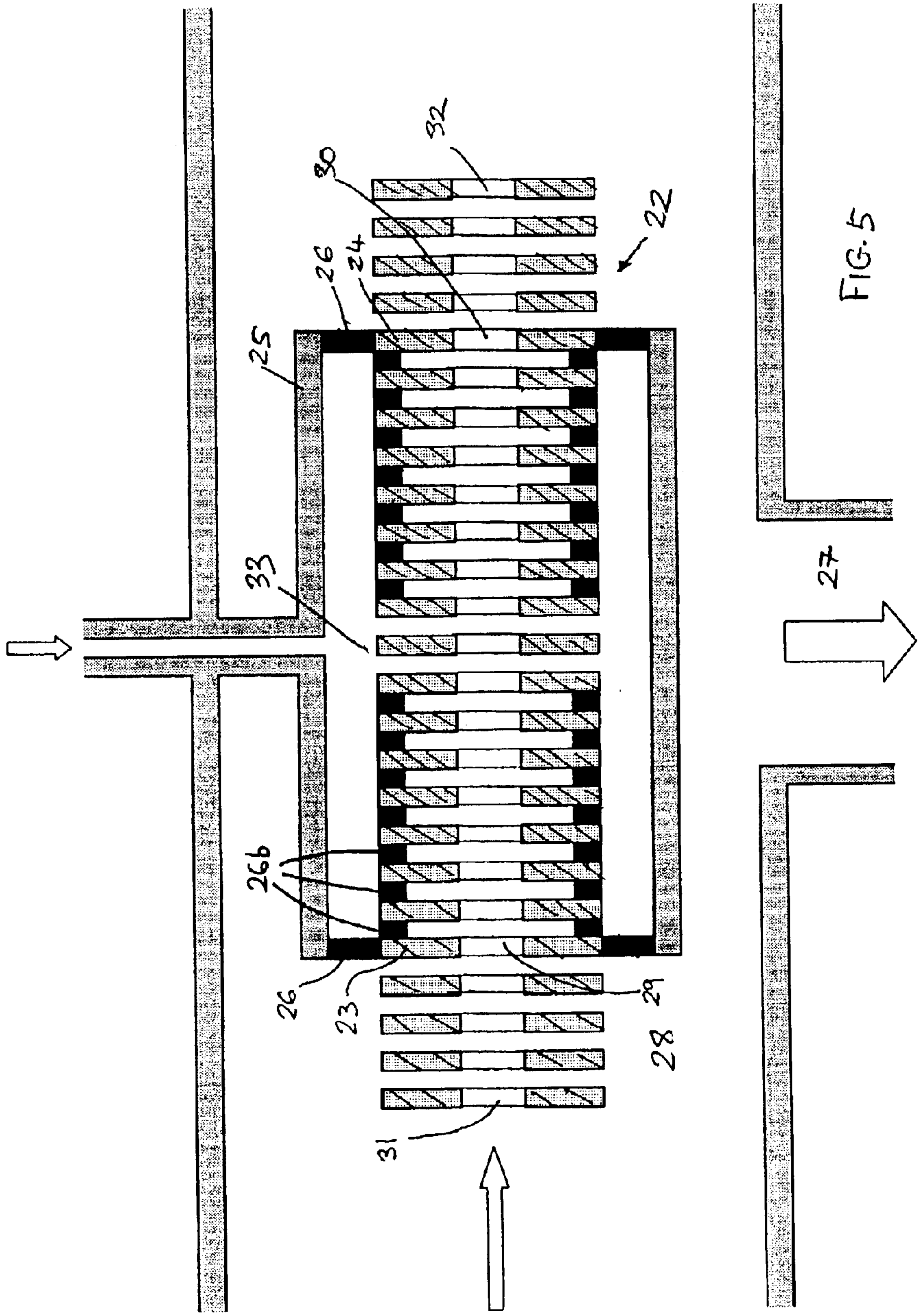
FIG. 5 shows a gas collision cell according to a further preferred embodiment.

FIG. 5 shows a yet further embodiment which is functionally similar to the embodiment shown in FIG. 4. According to this embodiment further insulators 26*b* are not directly mounted to the housing of the gas collision cell 25 but are preferably provided in between and mounted to adjacent electrodes within the housing of the gas collision cell 25. As with the embodiment shown in FIG. 4, outside of the high pressure region 33 gas can only escape from the region between two electrodes by passing through the aperture in an electrode towards either the inlet differential pumping aperture 29 or the outlet differential pumping aperture 30. The embodiment shown in FIG. 5 may in a similar manner to the embodiment shown in FIG. 4 either be considered to comprise a gas collision cell 25 comprising a plurality of differential pumping apertures within the gas collision cell 25 or it may be considered to comprise a gas collision cell 25 having a relatively thick composite inlet differential pumping aperture, a relatively small high pressure region 33 and a relatively thick composite outlet differential pumping aperture.

A conventional gas collision cell may, for example, be 185 mm long and have two thin 2.25 mm diameter orifices. The conductance of each orifice may be estimated as being 0.38 l/s. If the pressure within the conventional gas collision cell is p then the product of pressure times length equals 185 p.

The embodiment shown in FIG. 3 may have differential pumping electrodes 23,24 which have 5.0 mm diameter orifices and the gas collision cell 25 may be 185 mm long. The conductance of each orifice may be estimated as being 2.08 l/s. The pressure within the gas collision cell 25 may be estimated as being 0.183 p and hence the product of pressure times length equals 34 p.

The embodiment shown in FIG. 4 may comprise 61 electrodes having 5.0 mm diameter orifices. The gas collision cell 25 may be 185 mm long. The conductance of each orifice may be estimated as being 0.153 l/s by treating each orifice as a long smooth tube. This estimation is therefore rather pessimistic. The pressure within the gas collision cell 25 may be estimated as being 2.48 p with an average pressure of approximately 1.33 p. The average pressure may be calculated as being 0.5×(0.183+2.48)p since for the same gas flow the pressure in the exit orifice must be the same for the embodiments shown in FIGS. 3 and 4 due to the Clausing factor. Accordingly, for the embodiment shown in FIG. 4 the product of pressure times length equals 246 p.

The embodiment shown in FIG. 4 is therefore particularly preferred since this embodiment has a factor of ×1.33 improvement in the product of pressure times length compared with a conventional gas collision cell and also has the advantage of continuous AC or RF confinement. The FIG. 4 embodiment also has a factor of ×7.24 improvement in the product of pressure times length compared with the embodiment shown in FIG. 3.

Although the present invention has been described with reference to preferred embodiments, it will be understood by those skilled in the art that various changes in form and detail may be made without departing from the scope of the invention as set forth in the accompanying claims.

What is claimed is:

1. A mass spectrometer, comprising:

a gas collision cell comprising a housing having an inlet differential pumping aperture and an outlet differential pumping aperture; and an AC or RF ion guide extending within said gas collision cell, said AC or RF ion guide comprising a plurality of electrodes having apertures;

wherein said AC or RF ion guide extends upstream of said inlet differential pumping aperture and an electrode of said AC or RF ion guide forms said inlet differential pumping aperture.

2. A mass spectrometer, comprising:

a gas collision cell comprising a housing having an inlet differential pumping aperture and an outlet differential pumping aperture; and an AC or RF ion guide extending within said gas collision cell, said AC or RF ion guide comprising a plurality of electrodes having apertures;

wherein said AC or RF ion guide extends downstream of said outlet differential pumping aperture and an electrode of said AC or RF ion guide forms said outlet differential pumping aperture.

3. A mass spectrometer, comprising:

a gas collision cell comprising a housing having an inlet differential pumping aperture and an outlet differential pumping aperture; and an AC or RF ion guide extending within said gas collision cell, said AC or RF ion guide comprising a plurality of electrodes having apertures;

wherein said AC or RF ion guide extends upstream of said inlet differential pumping aperture and downstream of said outlet differential pumping aperture and an electrode of said AC or RF ion guide forms said inlet differential pumping aperture and an electrode of said AC or RF ion guide forms said outlet differential pumping aperture.

4. A mass spectrometer as claimed in claim 3, wherein one or more of said electrodes either: (i) form further differential pumping apertures within said gas collision cell; or (ii) form in conjunction with said inlet differential pumping aperture a composite inlet differential pumping aperture comprised of a plurality of electrodes having apertures therein and/or form in conjunction with said outlet differential pumping aperture a composite outlet differential pumping aperture comprised of a plurality of electrodes having apertures therein.

5. A mass spectrometer as claimed in claim 4, wherein either: (i) x further differential pumping apertures are formed within said gas collision cell; or (ii) the composite inlet and/or composite outlet differential pumping aperture comprise x electrodes having apertures therein, wherein x is selected from the group consisting of: (i) 2; (ii) 3; (iii) 4; (iv) 5; (v) 6; (vi) 7; (vii) 8; (viii) 9; (ix) 10; (x) 11; (xi) 12; (xii) 13; (xiii) 14; (xiv) 15; (xv) 16; (xvi) 17; (xvii) 18; (xviii) 19; (xix) 20; (xx) 20–30; (xxi) 30–40; (xxii) 40–50; (xxiii) 50–60; (xxiv) 60–70; (xxv) 70–80; (xxvi) 80–90; (xxvii) 90–100; (xxviii) 100–110; (xxix) 110–120; (xxx) 120–130; (xxxi) 130–140; (xxxii) 140–150; or (xxxiii) more than 150.

6. A mass spectrometer as claimed in claim 3, wherein said gas collision cell forms a substantially gas-tight enclosure apart from said inlet differential pumping aperture and said outlet differential pumping aperture.

7. A mass spectrometer as claimed in claim 6, wherein said gas collision cell further comprises a port through which a collision gas is introduced in use into said collision cell.

8. A mass spectrometer as claimed in claim 7, wherein said collision gas is selected from the group consisting of: (i) helium; (ii) argon; (iii) nitrogen; (iv) air; and (v) methane.

9. A mass spectrometer as claimed in claim 3, wherein ions enter said collision cell via said inlet differential pumping aperture and exit said collision cell via said outlet differential pumping aperture.

10. A mass spectrometer as claimed in claim 3, wherein at least 10%, 20%, 30%, 40%, 50%, 60%, 70%, 80%, 90%, 95% or 100% of said electrodes have substantially similar sized apertures.

11. A mass spectrometer as claimed in claim 3, wherein at least 10%, 20%, 30%, 40%, 50%, 60%, 70%, 80%, 90%, 95% or 100% of said electrodes have apertures which become progressively smaller or larger.

12. A mass spectrometer as claimed in claim 3, wherein an electrode forming said inlet differential pumping aperture and/or an electrode forming said outlet differential pumping aperture and/or one or more electrodes forming further differential pumping apertures within said gas collision cell have an aperture having a diameter selected from the group consisting of: (i) 0.5–1.5 mm; (ii) 1.5–2.5 mm; (iii) 2.5–3.5 mm; (iv) 3.5–4.5 mm; (v) 4.5–5.5 mm; (vi) 5.5–6.5 mm; (vii) 6.5–7.5 mm; (viii) 7.5–8.5 mm; (ix) 8.5–9.5 mm; (x) 9.5–10.5 mm; (xi) less than or equal to 10.0 mm; (xii) less than or equal to 9.0 mm; (xiii) less than or equal to 8.0 mm; (xiv) less than or equal to 7.0 mm; (xv) less than or equal to 6.0 mm; (xvi) less than or equal to 5.0 mm; (xvii) less than or equal to 4.0 mm; (xviii) less than or equal to 3.0 mm; (xix) less than or equal to 2.0 mm; (xx) less than or equal to 1.0 mm; (xxi) 0–2 mm; (xxii) 2–4 mm; (xxiii) 4–6 mm; (xxiv) 6–8 mm; and (xxv) 8–10 mm.

13. A mass spectrometer as claimed in claim 3, wherein at least 10%, 20%, 30%, 40%, 50%, 60%, 70%, 80%, 90%, 95% or 100% of the electrodes forming said AC or RF ion guide apart from an electrode forming said inlet differential pumping aperture and/or an electrode forming said outlet differential pumping aperture and/or one or more electrodes forming further differential pumping apertures within said gas collision cell have an aperture having a diameter selected from the group consisting of: (i) 0.5–1.5 mm; (ii) 1.5–2.5 mm; (iii) 2.5–3.5 mm; (iv) 3.5–4.5 mm; (v) 4.5–5.5 mm; (vi) 5.5–6.5 mm; (vii) 6.5–7.5 mm; (viii) 7.5–8.5 mm; (ix) 8.5–9.5 mm; (x) 9.5–10.5 mm; (xi) less than or equal to 10.0 mm; (xii) less than or equal to 9.0 mm; (xiii) less than or equal to 8.0 mm; (xiv) less than or equal to 7.0 mm; (xv) less than or equal to 6.0 mm; (xvi) less than or equal to 5.0 mm; (xvii) less than or equal to 4.0 mm; (xviii) less than or equal to 3.0 mm; (xix) less than or equal to 2.0 mm; (xx) less than or equal to 1.0 mm; (xxi) 0–2 mm; (xxii) 2–4 mm; (xxiii) 4–6 mm; (xxiv) 6–8 mm; and (xxv) 8–10 mm.

14. A mass spectrometer as claimed in claim 3, wherein an electrode forming said inlet differential pumping aperture and/or an electrode forming said outlet differential pumping aperture and/or one or more electrodes forming further differential pumping apertures within said gas collision cell have an aperture which is either: (i) substantially smaller than the other electrodes forming said AC or RF ion guide; (ii) substantially the same size as the other electrodes forming said AC or RF ion guide; or (iii) substantially larger than the other electrodes forming said AC or RF ion guide.

15. A mass spectrometer as claimed in claim 3, wherein said inlet differential pumping aperture and/or said outlet differential pumping aperture and/or one or more electrodes forming further differential pumping apertures within said gas collision cell have an area selected from the group consisting of: (i) less than or equal to 40 $mm^2$; (ii) less than or equal to 35 $mm^2$; (iii) less than or equal to 30 $mm^2$; (iv) less than or equal to 25 $mm^2$; (v) less than or equal to 20 $mm^2$; (vi) less than or equal to 15 $mm^2$; (vii) less than or equal to 10 $mm^2$; and (viii) less than or equal to 5 $mm^2$.

16. A mass spectrometer as claimed in claim 3, wherein said AC or RF ion guide comprises at least 4, 5, 6, 7, 8, 9, 10, 20, 30, 40, 50, 60, 70, 80, 90, 100, 110, 120, 130, 140, 150, 160, 170, 180, 190 or 200 electrodes.

17. A mass spectrometer as claimed in claim 3, wherein said gas collision cell is provided in a vacuum chamber maintained at a pressure selected from the group consisting of: (i) $<10^{-4}$ mbar; (ii) $<10^{-5}$ mbar; (iii) $<10^{-6}$ mbar; and (iv) $10^{-4}$–$10^{-6}$ mbar.

18. A mass spectrometer as claimed in claim 3, wherein the pressure within said gas collision cell is selected from the group consisting of: (i) $>10^{-4}$ mbar; (ii) $>10^{-3}$ mbar; (iii) $>10^{-2}$ mbar; (iv) $>10^{-1}$ mbar; and (v) $10^{-3}$–$10^{-1}$ mbar.

19. A mass spectrometer as claimed in claim 3, wherein said gas collision cell is maintained at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar.

20. A mass spectrometer as claimed in claim 3, wherein said gas collision cell is maintained at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

21. A mass spectrometer as claimed in claim 3, wherein said gas collision cell is maintained, in use, at a pressure selected from the group consisting of: (i) between 0.0001 and 10 mbar; (ii) between 0.0001 and 1 mbar; (iii) between 0.0001 and 0.1 mbar; (iv) between 0.0001 and 0.01 mbar; (v) between 0.0001 and 0.001 mbar; (vi) between 0.001 and 10 mbar; (vii) between 0.001 and 1 mbar; (viii) between 0.001 and 0.1 mbar; (ix) between 0.001 and 0.01 mbar; (x) between 0.01 and 10 mbar; (xi) between 0.01 and 1 mbar; (xii) between 0.01 and 0.1 mbar; (xiii) between 0.1 and 10 mbar; (xiv) between 0.1 and 1 mbar; and (xv) between 1 and 10 mbar.

22. A mass spectrometer as claimed in claim 3, wherein at least 10%, 20%, 30%, 40%, 50%, 60%, 70%, 80%, 90%, 95% or 100% of said electrodes are connected to both a DC and an AC or RF voltage supply.

23. A mass spectrometer as claimed in claim 3, wherein axially adjacent electrodes are supplied with AC or RF voltages having a phase difference of 180°.

24. A mass spectrometer as claimed in claim 3, wherein the length of said AC or RF ion guide is selected from the group consisting of: (i) 1–5 cm; (ii) 5–10 cm; (iii) 10–15 cm; (iv) 15–20 cm; (v) 20–25 cm; (vi) 25–30 cm; (vii) 30–35 cm; (viii) 35–40 cm; (ix) 40–45 cm; (x) 45–50 cm; and (xi) >50 cm.

25. A mass spectrometer as claimed in claim 3, further comprising an atmospheric pressure ion source.

26. A mass spectrometer as claimed in claim 3, further comprising an ion source selected from the group consisting of: (i) Electrospray ("ESI") ion source; (ii) Atmospheric Pressure Chemical Ionisation ("APCI") ion source; (iii) Atmospheric Pressure Photo Ionisation ("APPI") ion source; (iv) Matrix Assisted Laser Desorption Ionisation ("MALDI") ion source; (v) Laser Desorption Ionisation ("LDI") ion source; (vi) Inductively Coupled Plasma ("ICP") ion source; (vii) Electron Impact ("EI") ion source; (viii) Chemical Ionisation ("CI") ion source; (ix) a Fast Atom Bombardment ("FAB") ion source; and (x) a Liquid Secondary Ions Mass Spectrometry ("LSIMS") ion source.

27. A mass spectrometer as claimed in claim 3, further comprising a mass analyser selected from the group consisting of: (i) a Time of Flight mass analyser; (ii) an orthogonal acceleration Time of Flight mass analyser; (iii) a quadrupole mass analyser; (iv) a 2D (linear) or 3D (Paul) quadrupole ion trap; and (v) a Fourier Transform Ion Cyclotron Resonance ("FTICR") mass analyser.

28. A mass spectrometer as claimed in claim 3, wherein at least 10%, 20%, 30%, 40%, 50%, 60%, 70%, 80%, 90%, 95% or 100% of said plurality of electrodes are arranged to be maintained at substantially the same DC reference potential about which an AC or RF voltage supplied to said electrodes is superimposed.

29. A mass spectrometer as claimed in claim 3, further comprising means for supplying an AC or RF voltage to said electrodes.

30. A mass spectrometer as claimed in claim 3, wherein at least 5, 10, 15, 20, 25, 30, 35, 40, 45 or 50 of said electrodes are disposed upstream of said inlet differential pumping aperture and/or downstream of said outlet differential pumping aperture.

31. A mass spectrometer as claimed in claim 3, wherein at least 5, 10, 15, 20, 25, 30, 35, 40, 45 or 50 of said electrodes are disposed within said gas collision cell.

32. A mass spectrometer as claimed in claim 3, wherein, in use, one or more transient DC voltages or one or more transient DC voltage waveforms are progressively applied to at least some of said electrodes so that ions are urged along at least a portion of said gas collision cell.

33. A mass spectrometer as claimed in claim 3, wherein in use an axial DC voltage gradient is maintained along at least a portion of the length of said gas collision cell and wherein said axial DC voltage gradient either: (i) remains substantially constant with time whilst ions are being transmitted through said gas collision cell; or (ii) varies with time whilst ions are being transmitted through said gas collision cell.

34. A mass spectrometer as claimed in claim 3, wherein said gas collision cell comprises 3, 4, 5, 6, 7, 8, 9, 10, 11, 12, 13, 14, 15, 16, 17, 18, 19, 20, 21, 22, 23, 24, 25, 26, 27, 28, 29, 30 or >30 segments, wherein each segment comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or >30 electrodes and wherein the electrodes in a segment are maintained at substantially the same DC potential.

35. A mass spectrometer as claimed in claim 34, wherein a plurality of segments are maintained at substantially the same DC potential.

36. A mass spectrometer as claimed in claim 34, wherein each segment is maintained at substantially the same DC potential as the subsequent nth segment wherein n is 3, 4, 5, 6, 7, 8, 9, 10, 11, 12, 13, 14, 15, 16, 17, 18, 19, 20, 21, 22, 23, 24, 25, 26, 27, 28, 29, 30 or >30.

37. A mass spectrometer as claimed in claim 3, wherein ions are confined radially within said AC or RF ion guide by an AC or RF electric field.

38. A mass spectrometer as claimed in claim 3, wherein ions are radially confined within said AC or RF ion guide in a pseudo-potential well and are constrained axially by a real potential barrier or well.

39. A mass spectrometer as claimed in claim 3, wherein the transit time of ions through said gas collision cell is selected from the group consisting of: (i) less than or equal to 20 ms; (ii) less than or equal to 10 ms; (iii) less than or equal to 5 ms; (iv) less than or equal to 1 ms; and (v) less than or equal to 0.5 ms.

40. A mass spectrometer as claimed in claim 3, wherein at least 10%, 20%, 30%, 40%, 50%, 60%, 70%, 80%, 90%, 95% or 100% of the ions entering said gas collision cell are arranged to have, in use, an energy greater than or equal to 10 eV for a singly charged ion or greater than or equal to 20 eV for a doubly charged ion such that said ions are caused to fragment within said gas collision cell.

41. A mass spectrometer as claimed in claim 3, wherein at least 10%, 20%, 30%, 40%, 50%, 60%, 70%, 80%, 90%, 95% or 100% of the ions entering said gas collision cell are arranged to fragment upon colliding with collision gas within said gas collision cell.

42. A mass spectrometer as claimed in claim 3, wherein said gas collision cell and said AC or RF ion guide are arranged in a vacuum chamber, said vacuum chamber comprising a vacuum pump for pumping gas from said vacuum chamber so as to produce a partial vacuum in said vacuum chamber.

43. A mass spectrometer as claimed in claim 3, wherein the amplitude of an AC or RF voltage supplied to the electrodes upstream of said inlet differential pumping aperture and/or supplied to the electrodes downstream of said outlet differential pumping aperture is different to the amplitude of an AC or RF voltage supplied to the electrodes in the gas collision cell.

44. A mass spectrometer as claimed in claim 3, wherein in use one or more AC or RF voltage waveforms are applied to at least some of said electrodes so that ions are urged along at least a portion of said gas collision cell.

45. A method of mass spectrometry, comprising:

providing a gas collision cell having a housing with an inlet differential pumping aperture and an outlet differential pumping aperture and an AC or RF ion guide extending within said gas collision cell, said AC or RF ion guide comprising a plurality of electrodes having apertures and wherein said AC or RF ion guide extends upstream of said inlet differential pumping aperture and an electrode of said AC or RF ion guide forms said inlet differential pumping aperture; and passing ions through the portion of the AC or RF ion guide arranged upstream of said inlet differential pumping aperture, through said inlet differential pumping aperture and into the AC or RF ion guide arranged within said gas collision cell.

46. A method as claimed in claim 45, wherein ions remain radially confined within said AC or RF ion guide as they pass through the portion of the AC or RF ion guide arranged upstream of said inlet differential pumping aperture, through said inlet differential pumping aperture and into the AC or RF ion guide arranged within said gas collision cell.

47. A method of mass spectrometry, comprising:

providing a gas collision cell having a housing with an inlet differential pumping aperture and an outlet differential pumping aperture and an AC or RF ion guide extending within said gas collision cell, said AC or RF ion guide comprising a plurality of electrodes having apertures and wherein said AC or RF ion guide extends downstream of said outlet differential pumping aperture and an electrode of said AC or RF ion guide forms said outlet differential pumping aperture; and passing ions through the AC or RF ion guide arranged within said gas collision cell, through said outlet differential pumping aperture and into the portion of the AC or RF ion guide arranged downstream of said outlet differential pumping aperture.

48. A method as claimed in claim 47, wherein ions remain radially confined within said AC or RF ion guide as they pass through the AC or RF ion guide arranged within said gas collision cell, through said outlet differential pumping aperture and into the portion of the AC or RF ion guide arranged downstream of said outlet differential pumping aperture.

49. A method of mass spectrometry, comprising:

providing a gas collision cell having a housing with an inlet differential pumping aperture and an outlet differential pumping aperture and an AC or RF ion guide extending within said gas collision cell, said AC or RF ion guide comprising a plurality of electrodes having apertures and wherein said AC or RF ion guide extends upstream of said inlet differential pumping aperture and downstream of said outlet differential pumping aperture and an electrode of said AC or RF ion guide forms said inlet differential pumping aperture and an electrode of said AC or RF ion guide forms said outlet differential pumping aperture; and passing ions through the portion of the AC or RF ion guide arranged upstream of said inlet differential pumping aperture, through said inlet differential pumping aperture, through said AC or RF ion guide arranged within said gas collision cell, through said outlet differential pumping aperture and into the portion of the AC or RF ion guide arranged downstream of said outlet differential pumping aperture.

50. A method as claimed in claim 49, wherein ions remain radially confined within said AC or RF ion guide as they pass through the portion of the AC or RF ion guide arranged upstream of said inlet differential pumping aperture, through said inlet differential pumping aperture, through said AC or RF ion guide arranged within said gas collision cell, through said outlet differential pumping aperture and into the portion of the AC or RF ion guide arranged downstream of said outlet differential pumping aperture.

* * * * *